Figure 1:
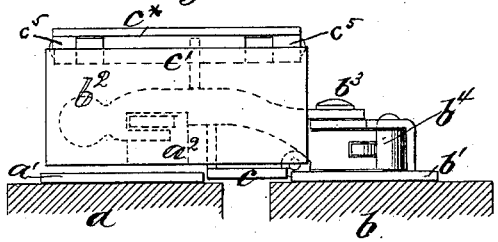

(Model.)

A. F. GARROOD.
FASTENER FOR MEETING RAILS OF SASHES.

No. 362,209. Patented May 3, 1887.

Witnesses.
Emil Herter
C. Sundgren

Inventor.
Arthur Fredrick Garrood
by his attorneys
Brown & Hall

UNITED STATES PATENT OFFICE.

ARTHUR FREDRICK GARROOD, OF RUTLAND ROAD, SOUTH HACKNEY, COUNTY OF MIDDLESEX, ENGLAND.

FASTENER FOR MEETING-RAILS OF SASHES.

SPECIFICATION forming part of Letters Patent No. 362,209, dated May 3, 1887.

Application filed November 6, 1886. Serial No. 218,152. (Model.) Patented in England March 14, 1884, No. 4,866.

*To all whom it may concern:*

Be it known that I, ARTHUR FREDRICK GARROOD, a subject of the Queen of Great Britain, residing at Rutland Road, South Hackney, in the county of Middlesex, England, baker, have invented a Safety Ventilating Sash-Fastener, (for which I have received Letters Patent in Great Britain, No. 4,866, dated March 14, 1884,) of which the following is a specification.

This invention is designed to allow of a space, say, of half an inch, being left between the upper and lower sash-frames of an ordinary window for the purpose of ventilation, and by a modification of the ordinary sash-fastener to effectually secure the sash from any attempt to open it from the outside by a knife or by an instrument, with a loop thrust up between the sashes and allowed to drop over and drag the end of the arm or latch of the fastener. It is also applicable as a safety or secure fastener where ventilation is not needed.

An ordinary sash-fastener is made in two pieces—viz., the catch and the arm or latch, each mounted on a plate which is screwed to the sash. In this invention the catch is not altered, but the arm is lengthened, and is made, by preference, of steel or hardened metal; and the plate under the arm has a hinged plate attached to its front edge, hereinafter referred to as the extension-plate. This extension-plate is continued upward perpendicularly at one end and brought over, so as to form three sides of a protecting-cover, inside which the arm works. At the unattached end of the upper horizontal portion of this cover is a hanging plate hinged thereto, and projecting from this hanging plate is a pin or stud resting on the arm in such manner that the said arm is fully protected from any attack coming either from above, the side, or beneath. The effect of this pin is to keep the hinged hanging plate from being lifted up, unless the arm is first moved; and the said arm can be thrust back only by pressure applied to the knob thereof in the front of the fastener. When this is done, the arm lifts the hanging plate and, coming into contact with a vertical pin or stay, throws back the entire inclosure, which is placed on the extension-plate.

It is an important feature of this invention that the entire arrangement is moved to and fro by one simple motion—viz., the pushing of the arm of the fastener in the ordinary way. Pressure applied to the arm throws back instantly and automatically the series of plates forming the box or inclosure around the arm, and in the same way, when the arm is drawn forward, the entire mechanism comes forward with it, and the sash is immediately secured.

Figure 2:
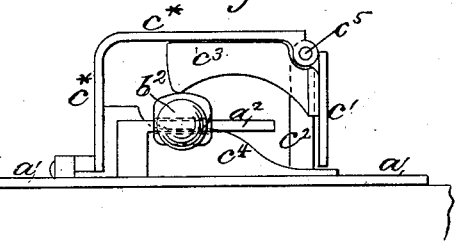
Figure 3:
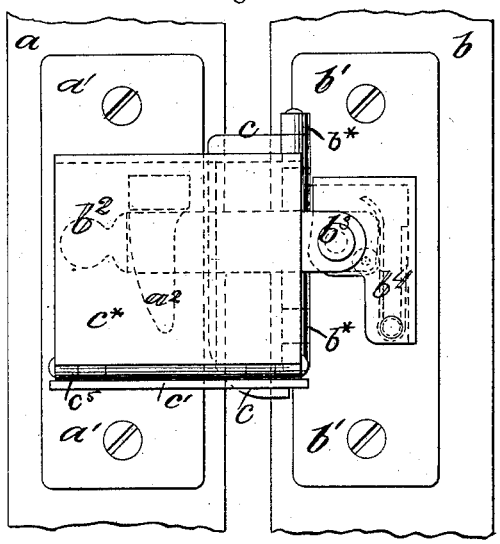
Figure 4:
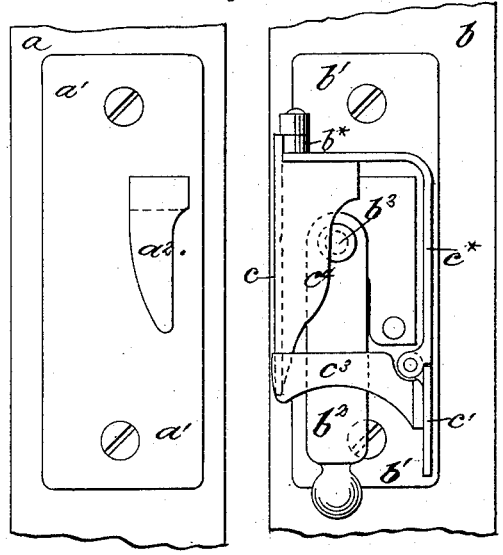
Figure 5:
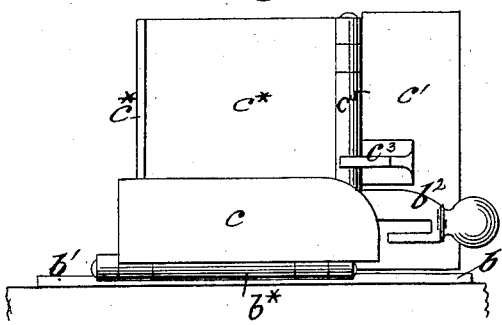
Figure 6:
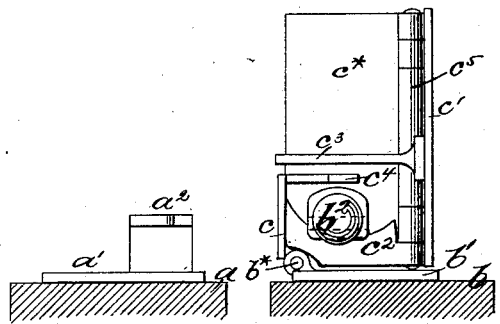

In the drawings, Figure 1 shows a side elevation. $a$ and $b$ are window-sashes, and $a'$ and $b'$ plates fixed thereon, the front or inside sash plate, $a'$, having the catch $a^2$ fixed thereon, with which the locking-lever $b^2$, moving on a pin-joint, $b^3$, on the sash-plate $b'$, engages to lock or secure the two sashes together, with the protecting-cover $c$ $c^*$ $c'$, closed over them. Fig. 2 shows an elevation, looking from the inside sash, with the window locked. Fig. 3 shows a plan of the parts in the same position, and Fig. 4 shows another plan of the parts when unlocked and the protecting-cover raised up into a vertical position. Figs. 5 and 6 show elevations of Fig. 4 with the parts unlocked and the protecting-cover raised.

The catch $a^2$ and the lever $b^2$ correspond with similar parts of ordinary sash-fasteners. The protecting-cover $c$ $c^*$ $c'$ consists, principally, of a bottom plate, $c$, which I term the "extension-plate," and an angular plate, $c^*$, formed in one piece with the said extension-plate, the said extension-plate being hinged at $b^*$ to the fixed plate $b'$, the angular plate $c^*$ forming the top and left-hand side to the said protecting-cover and the bottom or extension plate $c$ forming a cover to the division between the two sashes when the parts are closed and fastened by the lever $b^2$. Another plate, $c'$, hereinbefore referred to as the hanging plate, is hinged at $c^5$ to the right-hand edge of the top part of the angular plate $c^*$, to close the right-hand side of the protecting-cover.

By moving the lever $b^2$ to the right from under the catch $a^2$, the protecting-cover is opened and raised into a vertical position and closed again in the following manner:

The end of the lever $b^2$ in its outward movement first releases and then acts against the lower part of the hinged flap $c'$, to partly open it outward, and in its further movement it acts upon a curved surface formed upon a projection, $c^2$, fixed on the bottom plate $c$, the top of this projection being hinged or jointed to the top plate $c$, and thus acts to raise it into a vertical position.

In pulling the lever $b^2$, to secure the sashes together, it acts again on the projection $c^2$ to pull the cover $c$ over on its hinge, and in doing so acts upon an incline on the lever-arm $c^3$, fixed on the hinged flap $c'$, which it pulls down and holds firmly in position by resting upon the upper surface of the lever $b^2$. The lever $b^2$ in passing under the catch $a^2$ acts upon an incline, $c^4$, forming part of the bottom plate, by which action the protecting-cover is pressed down and held firmly by the stem of the lever $b^2$. The lever $b^2$ moves on a pin-joint at $b^3$, and is retained in position by a spring, $b^4$, acting upon its back end.

What I claim as my invention, and desire to secure by Letters Patent, is—

1. The combination, with the two plates of a window-fastening, a fixed catch on one, and a catch-lever pivoted to the other, of a protecting-cover which is hinged to the plate having the catch-lever and which forms a cover both to the space between the two plates and to the catch-lever, and a portion of which is within range of the catch-lever for enabling the latter to move the said cover for covering and uncovering at the same time the said lever and the space between the window-sashes, substantially as herein described.

2. The combination of the plates $a'$ $b'$, catch $a^2$, and lever $b^2$, of the protecting-cover consisting of the hinged bottom plate $c$, attached angular plate, and hinged hanging plate furnished with lever-arm $c^3$, and projection $c^2$ on the extension-plate, all substantially as herein described.

ARTHUR FREDRICK GARROOD.

Witnesses:
ARTHUR R. SKERTEN,
JOHN G. TONGUE.